Patented Dec. 2, 1924.

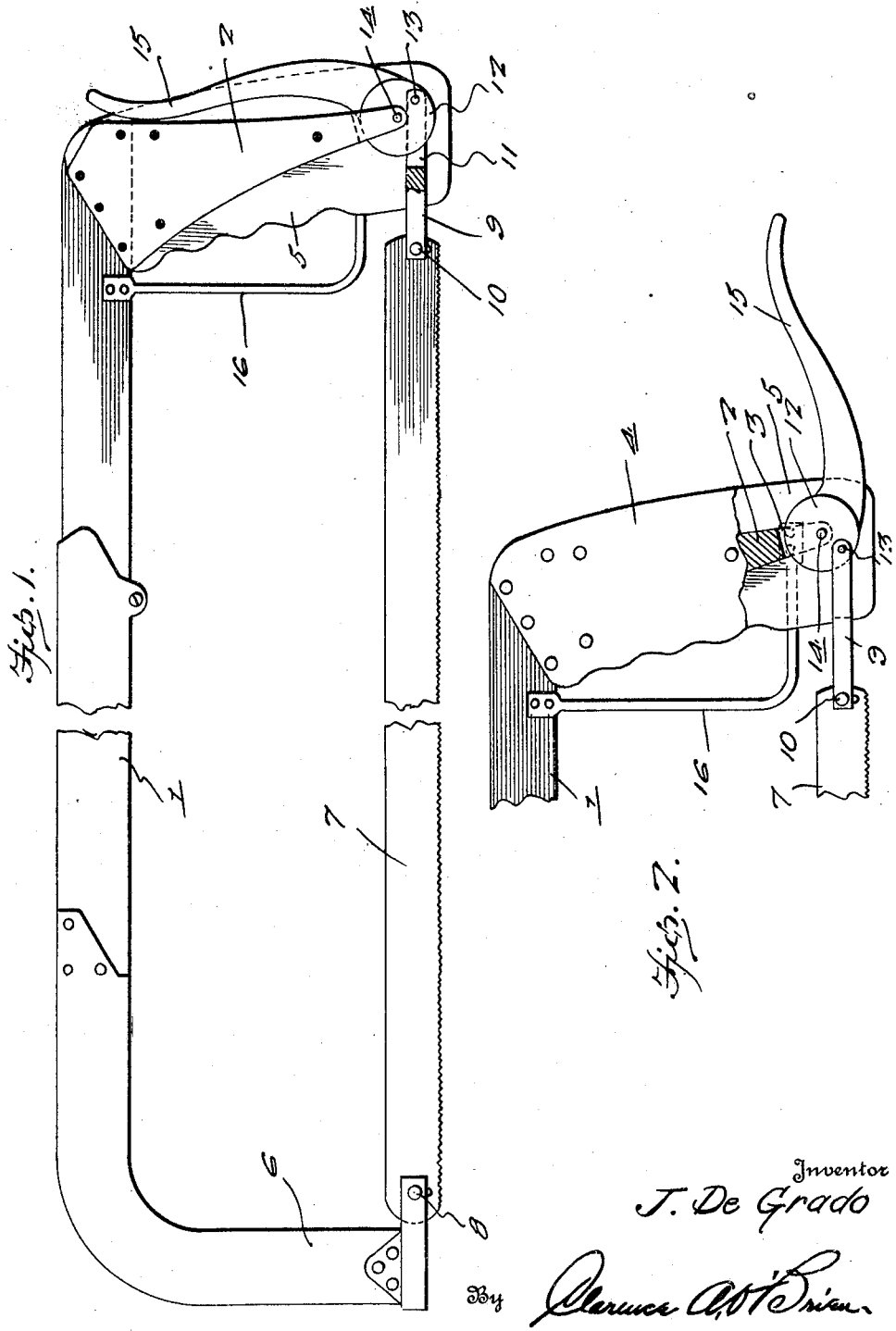

1,517,827

UNITED STATES PATENT OFFICE.

JOE DE GRADO, OF HOUSTON, TEXAS.

HACK-SAW FRAME.

Application filed May 23, 1924. Serial No. 715,392.

*To all whom it may concern:*

Be it known that I, JOE DE GRADO, a citizen of the United States, residing at Houston, in the county of Harris and State of Texas, have invented certain new and useful Improvements in a Hack-Saw Frame, of which the following is a specification.

This invention relates to new and useful improvements in hack saw frames and has for its principal object to provide a means whereby the saw blade may be easily and readily removed from the frame whenever it becomes necessary, means being further provided for tensioning the saw blade in the frame and holding the same in a taut position.

A further object of the invention is to provide a hack saw frame of the above mentioned character, which is simple in construction, inexpensive, strong and durable and furthermore adapted for the purposes for which it is designated.

Other objects and advantages of this invention will become apparent during the course of the following description.

In the accompanying drawing forming part of this specification and in which like numerals designate like parts throughout the same:

Figure 1 is a side elevation of a hack saw frame with a portion of the handle removed and showing the tensioning means in side elevation, and in a closed position, and Figure 2 is a fragmentary side elevation of the handle portion of the frame showing the tensioning means in an open position.

In the drawing wherein for the purpose of illustration is shown the preferred embodiment of my invention, the numeral 1 designates generally a hack saw frame which is of the usual construction, the same being preferably of the extensible type. One of the ends of the frame comprises a plate 2, and the same has its lower end bifurcated as shown at 3 for the purposes hereinafter to be more fully described. Arranged on each side of the plate 2 and secured thereto in any suitable manner are the handle portions 4 and 5 respectively. The inner side edges of the handle portions may be knurled for the purposes of providing a firmer gripping means when the saw frame and the saw blade carried therein is in use.

Secured to the end 6 of the frame 1 in any well known manner is one end of the saw blade 7. The connection therefor is illustrated at 8 in the drawing and the same is of such a construction as to enable the saw blade to be readily disengaged therefrom. The opposite end of the saw blade is detachably connected to the outer end of a connecting link 9 in the manner shown at 10 in the drawing.

This connecting link has its inner end bifurcated as shown at 11 and the bifurcated end is adapted to receive the eccentric 12 and is pivotally connected thereto in the manner shown at 13. The eccentric is supported in the bifurcated lower end of the plate 2 by means of the transversely extending pin 14. It is to be understood of course that the adjacent faces of the handle portions 4 and 5 at the point where the connecting link, the eccentric and the bifurcated end of the plate 12 are arranged, are provided with suitable recesses for enabling the several parts to properly operate. The eccentric 12 is provided with an elongated lever 15 which is adapted to operate between the outer side edges of the handle portions 4 and 5.

In inserting a blade in the frame, the same is connected to the end 6 in the usual manner, and the opposite end of the blade is connected to the outer end of the connecting link 9. The position of the connecting link and the eccentric, while the blade is being inserted in the frame, is shown in Figure 2 of the drawing. In order to adjust the blade to its proper tension to further hold the same in proper position in the frame, the free end of the lever 15 is swung upwardly between the outer sides of the handle portion causing the eccentric 12 to operate in the bifurcation 3 and 11 of the plate 2 and links 9 respectively whereby the connecting link 9 is drawn inwardly. When the parts are arranged as shown in Figure 1 of the drawing. The saw blade is placed under the proper tension and is held in this position so that the saw is now ready for use.

A guard such as is shown at 16 is associated with the saw frame and the handle portions and provides a means for protecting the fingers of the operator of the saw against becoming endangered should the saw blade accidentally break.

It will thus be seen from the foregoing description, that a saw frame and blade securing means therefor has been provided which is of such a construction as to enable the same to be readily and easily actuated and will further be strong and durable.

While I have shown the preferred embodiment of my invention, it is to be understood that various changes in the size, shape and arrangement of parts may be resorted to without departing from the spirit of the invention and the scope of the appended claim.

Having thus described the invention, what I claim is:—

In combination, a saw frame, a saw blade secured at one end to one end of the frame, a plate depending from the other end of the frame, the lower end of the plate being bifurcated, handle portions arranged on opposite sides of the plate and secured thereto, an eccentric supported in the bifurcated end of the plate, a link connected at one end to the opposite end of the blade, the other end of said link being bifurcated for receiving the eccentric and being connected thereto, and a lever associated with said eccentric for actuating the same.

In testimony whereof I affix my signature.

JOE DE GRADO.